(12) United States Patent
Schulte et al.

(10) Patent No.: US 10,705,814 B2
(45) Date of Patent: Jul. 7, 2020

(54) SYSTEMS AND/OR METHODS FOR GENERATING REASSEMBLABLE DISASSEMBLIES OF BINARIES USING DECLARATIVE LOGIC

(71) Applicant: GrammaTech, Inc., Ithaca, NY (US)

(72) Inventors: Eric Michael Schulte, Pittsburgh, PA (US); Antonio Enrique Flores Montoya, Ithaca, NY (US)

(73) Assignee: GRAMMATECH, INC., Ithaca, NY (US)

( * ) Notice: Subject to any disclaimer, the term of this patent is extended or adjusted under 35 U.S.C. 154(b) by 29 days.

(21) Appl. No.: 16/205,523

(22) Filed: Nov. 30, 2018

(65) Prior Publication Data

US 2020/0174765 A1 Jun. 4, 2020

(51) Int. Cl.
*G06F 8/53* (2018.01)
*G06F 8/30* (2018.01)

(52) U.S. Cl.
CPC ............... *G06F 8/53* (2013.01); *G06F 8/311* (2013.01)

(58) Field of Classification Search
CPC .................................. G06F 8/53; G06F 8/311
See application file for complete search history.

(56) References Cited

U.S. PATENT DOCUMENTS

| | | | | |
|---|---|---|---|---|
| 8,407,675 B1 * | 3/2013 | Clark | ........................ | G06F 8/53 717/131 |
| 8,930,916 B1 * | 1/2015 | Soeder | ...................... | G06F 8/75 717/133 |
| 9,875,087 B2 | 1/2018 | Scholz et al. | | |
| 2003/0065976 A1 * | 4/2003 | Bennett | ...................... | G06F 8/53 714/35 |
| 2016/0147517 A1 * | 5/2016 | Vicovan | ..................... | G06F 8/53 717/140 |
| 2016/0212159 A1 * | 7/2016 | Gupta | ................... | G06F 21/566 |
| 2016/0299748 A1 * | 10/2016 | Scholz | ..................... | G06F 8/427 |

(Continued)

OTHER PUBLICATIONS

David Brumley et al., "Alias Analysis for Assembly." Technical Report CMU-CS-06-180, Carnegie Mellon University School of Computer Science, Dec. 15, 2006, 26 pages.

(Continued)

*Primary Examiner* — Wei Y Zhen
*Assistant Examiner* — Amir Soltanzadeh
(74) *Attorney, Agent, or Firm* — Nixon & Vanderhye PC (57) ABSTRACT

Certain example embodiments relate to techniques for generating reassemblable disassemblies of binaries using declarative logic. A declarative logic programming language (e.g., Datalog) is used to compile reverse engineering, binary analysis, and disassembly rules into a format applicable to an executable program, yielding disassembly of that program. Datalog, for example, can be used as a query language for deductive databases, to facilitate this approach. Certain example embodiments thus involve (1) preparation of an executable for Datalog analysis, (2) inference rules and the application of Datalog for program analysis, including the application of Datalog to the domain of binary reverse engineering and analysis, and (3) the collection of assembly code from the results of the Datalog analysis. These rules can include both "hard rules" and "soft rules" or heuristics, even though standard Datalog does not support the latter.

20 Claims, 4 Drawing Sheets

(56) References Cited

U.S. PATENT DOCUMENTS

2017/0116108 A1* 4/2017 Miskelly ............. G06F 11/3624
2018/0225096 A1* 8/2018 Mishra ...................... G06F 8/30

OTHER PUBLICATIONS

John Whaley et al., "Using Datalog with Binary Decision Diagrams for Program Analysis." Asian Symposium on Programming Languages and Systems. Springer, Berlin, Heidelberg, 2005, 22 pages.

Martin Bravenboer et al., "Strictly Declarative Specification of Sophisticated Points-to Analyses." ACM SIGPLAN Notices 44.10, Oct. 25-29, 2009, 243-262.

Wikipedia—Datalog, retrieved Nov. 30, 2018, 7 pages. https://en.wikipedia.org/wiki/Datalog.

Wikipedia—Declarative Programming, retrieved Nov. 30, 2018, 4 pages. https://en.wikipedia.org/wiki/Declarative_programming.

Wikipedia—Decompiler, retrieved Nov. 30, 2018, 7 pages. https://en.wikipedia.org/wiki/Decompiler.

Wikipedia—Disassembler, retrieved Nov. 30, 2018, 3 pages. https://en.wikipedia.org/wiki/Disassembler.

"What Exactly is Binary Disassembly and What it Produces", Reverse Engineering, retrieved Nov. 30, 2018, 11 pages. https://reverseengineering.stackexchange.com/questions/18276/what-exactly-is-binary-disassembly-and-what-it-produces.

"Why there are not any disassemblers that can generate re-assemblable ASM code", Reverse Engineering, retrieved Nov. 30, 2018, 13 pages. https://reverseengineering.stackexchange.com/questions/3800/why-there-are-not-any-disassemblers-that-can-generate-reassemblable-asm-code.

"Logic Defined Static Analysis", retrieved Nov. 30, 2018, 1 page. https://souffle-lang.github.io/.

GTIRB—GrammaTech Intermediate Representation for Binaries, retrieved Nov. 30, 2018, 5 pages. https://grammatech.github.io/gtirb/.

* cited by examiner

SYSTEMS AND/OR METHODS FOR GENERATING REASSEMBLABLE DISASSEMBLIES OF BINARIES USING DECLARATIVE LOGIC

TECHNICAL FIELD

Certain example embodiments described herein relate to techniques for use with computer programming languages. More particularly, certain example embodiments relate to techniques for generating reassemblable disassemblies of binaries using declarative logic.

BACKGROUND AND SUMMARY

Computer programs typically are written in high-level programming languages. High-level programming language code typically is architecture independent. Compilation generally involves transforming the high-level architecture-independent code into low-level architecture-specific code, which maintains the original meaning. For example, a computer program may be written in C and transformed into an x86 assembly language. Although somewhat less intuitive than most high-level programming languages, compilers oftentimes will generate human-readable and human-understandable ASCII text as output. Assembly language thus is sometimes called symbolic machine code.

Assembly language code generally will be transformed into a sequence of binary values, or object code, that conforms to the instruction set specification of a target central processing unit (CPU) via an assembler. In other words, an assembler will receive assembly language code as input and generate machine language code executable by a CPU. Machine language/object code is not encoded in ASCII format and thus is neither human-readable nor human-understandable.

An assembler program creates object code by, among other things, translating combinations of mnemonics and syntax for operations and addressing modes into their numerical equivalents. This representation typically includes an operation code (opcode), as well as other control bits and data. The assembler also calculates constant expressions and resolves symbolic names for memory locations and other entities, and oftentimes also will perform other tasks such as, for example, optimizations, etc.

Many programs are distributed only in machine code form. However, it sometimes might be desirable to disassemble a binary or sequence of object code. For example, it may be desirable to disassemble a binary or sequence of object code to test for vulnerabilities or potential exploits, to replay applications for forensic analysis or the like, for reverse engineering purposes, etc.

A disassembler is a computer program that translates machine language into assembly language and, thus, is at least some respects the "inverse" of an assembler. The output of a disassembler typically is formatted for human-readability rather than suitability for input to an assembler (e.g., and thus typically is not suitable for use in (re-)generation of machine language code).

Those skilled in the art know that it can be difficult, and sometimes impossible, to generate completely accurate disassemblies. Similarly, those skilled in the art know that it can be difficult, and sometimes impossible, to generate reassemblable disassemblies.

For example, it can be difficult to know which of plural semantic equivalents is/are used when disassembling machine code. Consider, for example, typical many-to-one functionality of the assembler instead, e.g., as the same sequence of bytes may disassemble to one sequence of instructions when starting disassembly from the first byte, or may disassemble to a second unrelated sequence of instructions when starting disassembly from the second byte. This is exacerbated by that fact that, as those skilled in the art know, it is difficult to determine the offsets at which instructions start. As another example, optimizations run on the assembly code by the assembler that are reflected in the corresponding machine code may not be translated back into the "un-optimized" original assembly code. Data interpretations issues can also arise. Consider four opcodes, with instruction a being 0101, instruction b being 0011, instruction c being 01010011, and instruction d being 00110101. The sequence 0101001100110101 thus could be interpreted as abba, cd, cab, etc.

Generally speaking, and as can be appreciated from the examples above and the experience of those skilled in the art, the generation of a reassemblable disassembly is complicated for several reasons. First, assembly and compilation processes are lossy. At the machine language level, there are no variable or function names, and variable type information can be determined only by how the data is used rather than explicit type declarations. For instance, a transfer of (for example) 32-bits of data could involve a 32-bit integer, a 32-bit floating point value, a 32-bit pointer, etc. The fact that a value could be a memory address or a symbol (value) can be particularly problematic in terms of generating a reassemblable disassembly, as it can be unclear whether a sequence is pointing at a symbol (value) or a pointer to a completely different symbol (value).

Second, assembly and compilation processes are many-to-many operations. A source program can be translated to assembly language in many ways, and machine language can be translated back to source in many different ways. Indeed, compilers and assemblers can be very language, library, architecture, and/or otherwise specific, so (for example) disassembling machine code for equivalent programs produced using different assemblers and/or compilers can yield very different results.

Because the emphasis generally is on human understandability with respect to the disassembly, and because equivalent functionality may be reproduced in at least some instances, the inability to create an exact replica of a disassembly and/or an exact replica of machine code from a disassembly is/are not necessarily problematic in all instances. Some ambiguity and incorrectness might well be tolerable in many scenarios. Indeed, inaccuracies can be corrected manually in some instances, and simply "tolerated" or "accepted" in others. Thus, the fact that there is a strong relationship between assembly language and machine language oftentimes is seen as sufficient, even though there is not a one-to-one mapping between assembly language and machine language.

Unfortunately, however, these problems can become exacerbated and unacceptable if the disassembled code needs to be accurate for some reason. For instance, ambiguities, inaccuracies, and the like, may be unacceptable in applications geared towards identifying security vulnerabilities, assessing mission-critical operations, etc. The same may hold true where disassembled code needs to be modified prior to reassembly.

Thus, it will be appreciated that it would be desirable to address the above-described and/or other issues. For instance, it will be appreciated that it would be desirable to generate more accurate disassemblies and/or reassemblable disassemblies. Certain example embodiments help in these and/or other regards.

In certain example embodiments, a method of disassembling an executable is provided. The method includes: parsing the executable, and decoding possible instructions in the executable in connection with the parsing; generating an initial fact database comprising the possible instructions; generating an enhanced fact database by executing a plurality of inference modules on the initial fact database, at least some of the inference modules being expressed in a declarative query language and including (a) a code inference module structured to compute valid instructions organized in blocks of code, (b) a symbolization module structured to disambiguate between symbols and memory addresses, and (c) a function inference module structured to identify functions; and organizing content from the enhanced fact database into a format of valid assembler code.

According to certain example embodiments, the declarative query language may be Datalog.

According to certain example embodiments, one or more of the inference modules may implement a soft heuristic in addition to hard rules for fact generation. In some instances, all hard rules and soft heuristics may be encoded into Datalog rules. In certain example embodiments, execution of a Datalog engine on the Datalog rules may result in a consistent fact universe for the initial fact database and the enhanced fact database.

According to certain example embodiments, new hard rules and/or new soft heuristics may be definable and suitable for use in generating facts for the initial fact database and/or enhanced fact database, independent of existing hard rules and/or soft heuristics.

According to certain example embodiments, one or more of the inference modules may implement a heuristic by: generating a problem/solution space for the issue for which evidence is to be built and/or for which a conflict is to be resolved; subjecting at least some of the members in the problem/solution space to rules that assign points to different outcomes related to the issue for which the evidence is to be built and/or for which the conflict is to be resolved; determining which one or more members of the problem/solution space has/have the most points; and admitting to the enhanced fact database the one or more members of the problem/solution space determined to have the most points. A heuristic may be implemented for code block detection in the code inference module, for example.

According to certain example embodiments, the symbolization module may implement heuristics for determining that an array likely is present based on the presence of a plurality of evenly-spaced symbols, determining that an accessed address likely is a valid pointer based on a size of the associated access being pointer-sized, determining that a pointer candidate in what appears to be a string is less likely to be a valid pointer, and/or determining that a pointer candidate that is aligned is more likely to be a valid pointer.

According to certain example embodiments, the symbolization module may include definition to use chain analysis, value analysis, and/or data access analysis.

According to certain example embodiments, the function inference module may use symbol information and heuristics to identify a first set of functions, and attempts to add a second set of functions by finding blocks of code that are contiguous to, but not reachable from, a complete function in the first set of functions.

According to certain example embodiments, the valid assembler code may be assembleable into a valid executable.

According to certain example embodiments, one or more of the inference modules may be configured to receive additional rules from a user and/or from additional programmatic analysis.

Counterpart system, computer program, and/or non-transitory computer readable storage media also are contemplated herein. For instance, in certain example embodiments, a system for disassembling an executable includes a non-transitory computer readable storage medium. Processing resources including at least one memory and a hardware processor, the processing resources being configured to: receive the executable; parse the executable, and decode possible instructions in the executable in connection with the parsing; generate an initial fact database comprising the possible instructions, the initial fact database being stored to the non-transitory computer readable storage medium; generate an enhanced fact database by executing a plurality of inference modules on the initial fact database, at least some of the inference modules being expressed in a declarative query language and including (a) a code inference module structured to compute valid instructions organized in blocks of code, (b) a symbolization module structured to disambiguate between symbols and memory addresses, and (c) a function inference module structured to identify functions, the enhanced fact database being stored to the non-transitory computer readable storage medium; and organize content from the enhanced fact database into a format of valid assembler code. Similarly, in certain example embodiments, there is provided a non-transitory computer readable storage medium tangibly storing a program that, when executed by a computing system including at least one processor, is configured to disassemble an executable, by performing functionality comprising: parsing the executable, and decoding possible instructions in the executable in connection with the parsing; generating an initial fact database comprising the possible instructions; generating an enhanced fact database by executing a plurality of inference modules on the initial fact database, at least some of the inference modules being expressed in a declarative query language and including (a) a code inference module structured to compute valid instructions organized in blocks of code, (b) a symbolization module structured to disambiguate between symbols and memory addresses, and (c) a function inference module structured to identify functions; and organizing content from the enhanced fact database into a format of valid assembler code. The features described in the preceding paragraphs and those set forth in more detail below may be used with these counterparts, as well.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to techniques for reconstructing assembly code from an executable program. A declarative logic programming language is used to compile reverse engineering, binary analysis, and disassembly rules into a format that may be applied to an executable program, yielding disassembly of that program. Datalog, for example, can be used as a query language for deductive databases, to facilitate this approach. Certain example embodiments thus involve (1) preparation of an executable for Datalog analysis, (2) inference rules and the application of Datalog for program analysis, including the application of Datalog to the domain of binary reverse engineering and analysis, and (3) the collection of assembly code from the results of the Datalog analysis. Specific Datalog rules used for analysis and disassembly are set forth below. Additionally, as will become clearer from the description below, these rules can include both "hard rules" and "soft rules" or heuristics, even though standard Datalog does not support the latter. The reconstruction of assembly code from an executable program is a useful capability, for example, in enabling analysis, modification, and recompilation of the executable.

Datalog is a declarative logic programming language that, syntactically, is a subset of Prolog. Datalog is often used as a query language for deductive databases. Statements of a Datalog program can be stated in any order. Furthermore, Datalog queries on finite sets are guaranteed to terminate. As is known to those skilled in the art, the declarative programming paradigm (to which Datalog adheres, as noted above) expresses the logic of a computation without describing its control flow. Declarative programming often considers programs as theories of a formal logic, and computations as deductions in that logic space.

Figure 1:
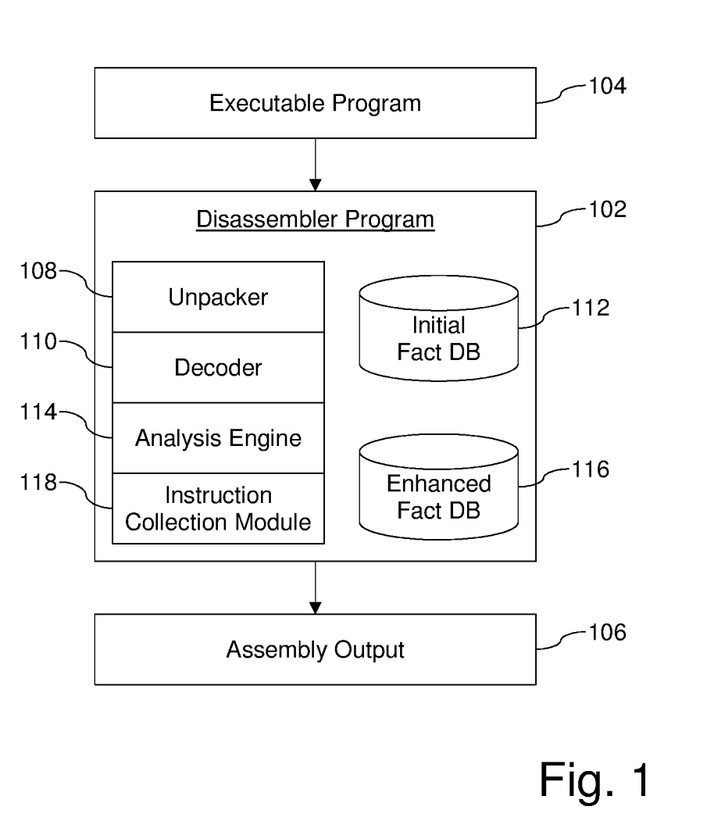
FIG. 1 is a block diagram schematically showing the application of a disassembler program to an executable to produce assembly code as output, in accordance with certain example embodiments.
Figure 2:
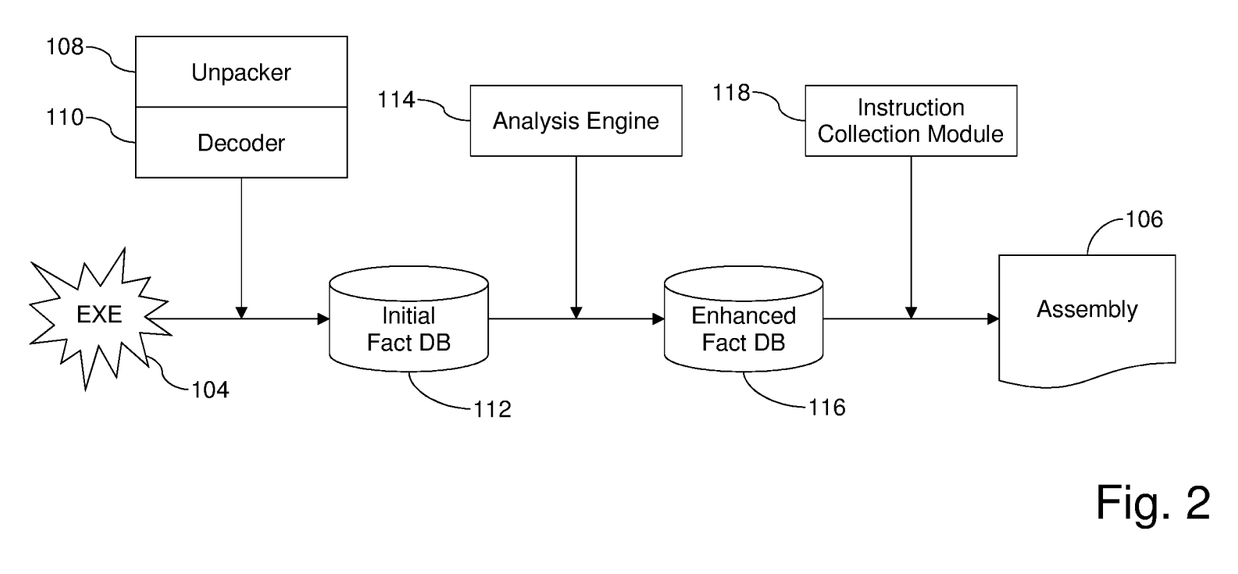
FIG. 2 shows an example overall workflow for the FIG. 1 components, in accordance with certain example embodiments.

Referring now more particularly to the drawings in which like reference numerals indicate like parts throughout the several views, FIG. 1 is a block diagram schematically showing the application of a disassembler program 102 to an executable 104 to produce assembly code 106 as output, in accordance with certain example embodiments; and FIG. 2 shows an example overall workflow for the FIG. 1 components, in accordance with certain example embodiments. As shown in FIGS. 1-2, the executable program 104 serves as input to the disassembler program 102. This input may be in any suitable executable file format such as, for example, the Linux executable and linkable format (ELF). The assembly code 106 is the output of the disassembler program 102 and corresponds to the original executable program 104.

The unpacker 108 parses the file format of the executable 104. Thus, the unpacker 108 provides simple information concerning the executable 104 to seed the Datalog analysis. The instruction decoder 110 works with the unpacker 108 to decode potential instructions from the executable 104. The unpacker 108 and the instruction decoder 110 help populate the initial fact database 112. The initial fact database 112 in this sense stores simple facts concerning the executable 104. It may be organized in a format enabling subsequent processing by Datalog. Facts can include, for example, information present explicitly in tables in the executable file 104, as well as all possible instruction decodings from the executable 104. The instruction decoder 110 provides instruction-related facts for the Datalog analysis, which will reject some instructions, confirm some instructions, and add symbolic information to instruction operands, in addition to performing other analyses. In this regard, the decoding of every possible instruction offset creates a superset of possible instruction offsets to prepare a binary for subsequent analysis via Datalog.

A Datalog analysis engine 114 is used to apply inference rules, which are expressed in Datalog and are designed to perform disassembly, to the initial database 112 of simple facts. This analysis generates increasingly sophisticated information about the assembly code of the executable 104 until the analysis completes. The result of the Datalog analysis engine 114 is a final enhanced fact database 116. The enhanced fact database 116 has sufficient information so that assembly code 106 for the original executable 104 can be extracted. The enhanced fact database 116 may include, for example, the location of code in the executable 104, symbolization of values in the executable 104, the boundaries of functions in the executable 104, etc.

A Datalog program is a collection of Datalog rules. A Datalog rule is a restricted kind of horn clause with the following format: h: –t1, t2, . . . tn where h, t1, t2, . . . tn are predicates. Rules represent a logical entailment: his true only if t1, t2, . . . , and tn are true. One property of Datalog rules is that they can be recursive. For example, the following rules describe an ancestor relation based on a parent relation:

ancestor(X,Y):-parent(X,Y).
ancestor(X,Y):-ancestor(X,Z), parent(Z,Y).
These rules can be expressed in natural language as follows:
X is an ancestor of Y if X is a parent of Y or
X is an ancestor of Y if X is an ancestor of Z and Z is a parent of Y.

A Datalog engine takes as input a set of facts (which are predicates known to be true) and a Datalog program (a set of rules). The initial set of facts defines the initial knowledge, and it is commonly known as the extensional database (EDB). The set of Datalog rules is commonly known as the intensional database (IDB). Then, the Datalog engine generates a new set of facts by repeatedly applying the inference rules.

Continuing with the previous example, consider the following set of initial facts: parent (mary, john), parent (john, james). The Datalog engine applies the first rule twice to generate ancestor (mary, john) and ancestor (john, james) and then it applies the second rule once to generate ancestor (mary, james). These three generated facts are the output of the Datalog engine. The enhanced database 116 is the union of the initial facts (EDB) and the inferred facts.

The used Datalog engine takes a Datalog program and generates highly efficient C++ parallel code, for example. It does that in certain example instances by applying futamura projections to a Datalog interpreter applied to the Datalog program. The Datalog interpreter is based on semi-naïve evaluation. The Datalog engine also supports rules with stratified negation, arithmetic operations, and aggregation predicates. Aggregation predicates can count the number of facts of some type or compute the maximum, minimum or sum of a set of facts. This capability is useful in implementing "soft" heuristics as discussed herein. Soufflé may be used in certain example embodiments.

The instruction collection module 118 helps organize the information in the enhanced fact database 116 into the format of valid assembler code 106. Thus, the assembly code 106 may be thought of as being collected from the enhanced fact database 116. The instruction collection module generates an internal binary representation (e.g., in gtirb format, as defined via Github, for example) including an interprocedural control flow graph, a set of data objects that partition the data sections of the binary, and a set of auxiliary tables that contain information relative to the symbols and function locations. The information generated by the code inference is used to build the control flow graph and the symbolization information is used to partition the data sections into data objects. The internal representation can then be used to transform the binary and to print assembly code that is ready for reassembly.

The framework discussed above advantageously uses a declarative program engine for binary reverse engineering and analysis, as well as disassembly. As noted above, Datalog may be compiled into an efficient executable format for these and/or other purposes, and the unpacker and decoder in essence may help to prepare a binary for the subsequent Datalog-based analysis. It will be appreciated that the unpacker and/or decoder may be external to the Datalog-based analysis engine in certain example embodiments.

Datalog inference rules advantageously may be used for the modular development of binary analysis heuristics. Advantageously, many rules and modules (e.g., including those described below, for example) may be developed independently of one another but nonetheless may be fully automatically combined by the Datalog analysis engine in performing a unified analysis. The modularity of analysis heuristics promotes flexibility, as the analysis engine can be updated to take into account different assemblers, hardware architectures, etc., which may impact how the binaries are generated. Similarly, the modularity of analysis heuristics promotes flexibility, as rules may be swapped in and out automatically, e.g., as determinations of efficacy are made for individual rules and combinations or sub-combinations of rules, as experience with the disassembler program grows, etc.

As indicated above, the decoder may generate a list of all possible instructions, and the determination of where actual instruction blocks begin and end may be made from this list. Sometimes, however, it may be difficult to build evidence for, and resolve conflicts, in Datalog, e.g., when determining where actual instruction blocks begin and end. See, for example, the illustration above in which the sequence 0101001100110101 can reasonably be interpreted as abba, cd, cab, etc. Certain example embodiments address this concern and provide an approach for efficiently building evidence for, and resolving conflicts in, Datalog. This is made possible in certain example embodiments via the specification of "soft" heuristics. These "soft" heuristics may be implemented as described below, even though Datalog is a language that only permits hard "rules."

Figure 3:
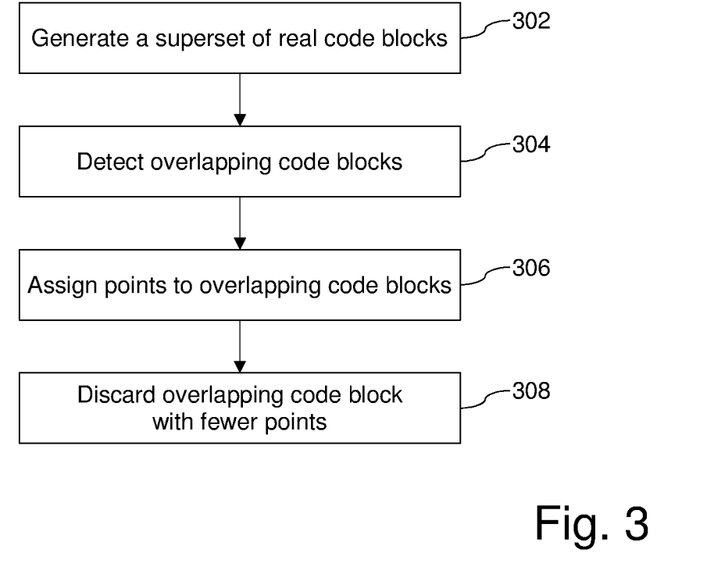
FIG. 3 is a flowchart showing how soft heuristics can be implemented using hard rules to build evidence for, and resolve conflicts in, analysis in connection with code block detection, in certain example embodiments.

FIG. 3 is a flowchart showing how soft heuristics can be implemented using hard rules to build evidence for, and resolve conflicts in, analysis in connection with code block detection, in certain example embodiments. As will become clearer from the below, this specific approach may be used in connection with the code inference module of certain example embodiments. In any event, the FIG. 3 example approach involves generating a superset of the real code blocks (step 302). Code blocks that are overlapping then are detected (step 304). For overlapping code blocks, a set of facts that give points to each of the blocks is generated (step 306). In other words, these hard rules assign points that can be compared to one another objectively and absolutely. The collection of the hard rules that assign points as well as the hard rules that come up with an answer based on the assignment of points collectively represent the heuristics.

The following code snippets are examples of rules that may be used to assign points to the blocks:
// give 20 points to a block 'Block' if it is the entry point of the program
block_points(Block,0,20,"start point"):-
  entry_point(Block).
// give 4 points to block 'Block' for each other block 'OtherBlock' that is not overlapping with anything and has a direct jump to 'Block'
block_points(Block,OtherBlock,4,"direct jump"):-
  direct_jump(EA,Block),
  phase2.likely_ea(EA,OtherBlock),
  OtherBlock!=Block,
  !block_is_overlaping(OtherBlock).

Finally, given two overlapping blocks, the one that has fewer points is discarded (step 308). The following code snippet is a simplified version of the rule for doing so:
discarded_block(Block):-
  block_overlap(Block,Block2)
  sum X:{block_points(Block,_,X,_)}<sum Y:{block_points(Block2,_,Y,_)}.
where sum x: {bloc pred (Block,_,X,_)} sums all the points for the Block generated with the previous rules.

It will be appreciated that there may be more than one set of overlapping code blocks, and that a given set may include two or more overlapping code blocks. The approach described above may be used in such cases, e.g., on an overlapping set by overlapping set basis. Similarly, the comparison may be performed two at a time, three at a time, etc., in different implementations.

It will be appreciated from the above that this or a similar approach may be used to build evidence for, and resolve conflicts associated with, other issues. For instance, a similar approach may be used when assigning a data access pattern to a memory location. In such a case, there may be multiple candidates, and a choice may be made from among such candidates by considering, for example, the "distance" to the initial memory access. This could be seen as assigning a number of points equal to the distance, with the difference being that the data access pattern with the minimum distance is selected. As another example, this or a similar approach may be used for integrating the heuristics for function boundary identification described below.

In general, one form of soft heuristics may be implemented by (a) generating the problem/solution space for the issue for which the evidence is to be built and/or for which the conflict is to be resolved, (b) defining a plurality of hard rules that assign points to different outcomes related to the issue for which the evidence is to be built and/or for which the conflict is to be resolved, (c) subjecting at least some of the members in the problem/solution space to the hard rules, (d) determining which one or more members of the problem/solution space has/have the most points, and (e) admitting to the enhanced database the one or more members of the problem/solution space determined to have the most points. As will be apparent from the below, soft heuristics may be implemented in other ways, e.g., by providing pre-set rules-of-thumb or the like, accepting facts based on whether a rule-of-thumb produces a score above a predetermined threshold, etc.

It also will be appreciated from the above that certain example embodiments implement specific rules and heuristics enabling efficient disassembly in Datalog. In this regard, the analysis engine of certain example embodiments may be structured to run to perform declarative query program logic (e.g., in Datalog) organized in a plurality of different modules on the facts in the initial fact database and/or output from modules executed in serial and/or in parallel. For instance, the analysis engine of certain example embodiments implements a disassembly approach that has three main components, namely, code inference, symbolization, and function inference, components. These components are shown in the FIG. 4 example block diagram and are implemented in Datalog in certain example embodiments. Symbolization may include, for example, def_use analysis, value analysis, data access analysis, pointer reattribution, and/or the like. In addition to the code inference, symbolization, and function inference components, one or more modules may be provided to consider special cases such as, for example, relative jump tables, as well as generic components and tables. Each of the three main components is discussed, in turn, below.

Figure 4:
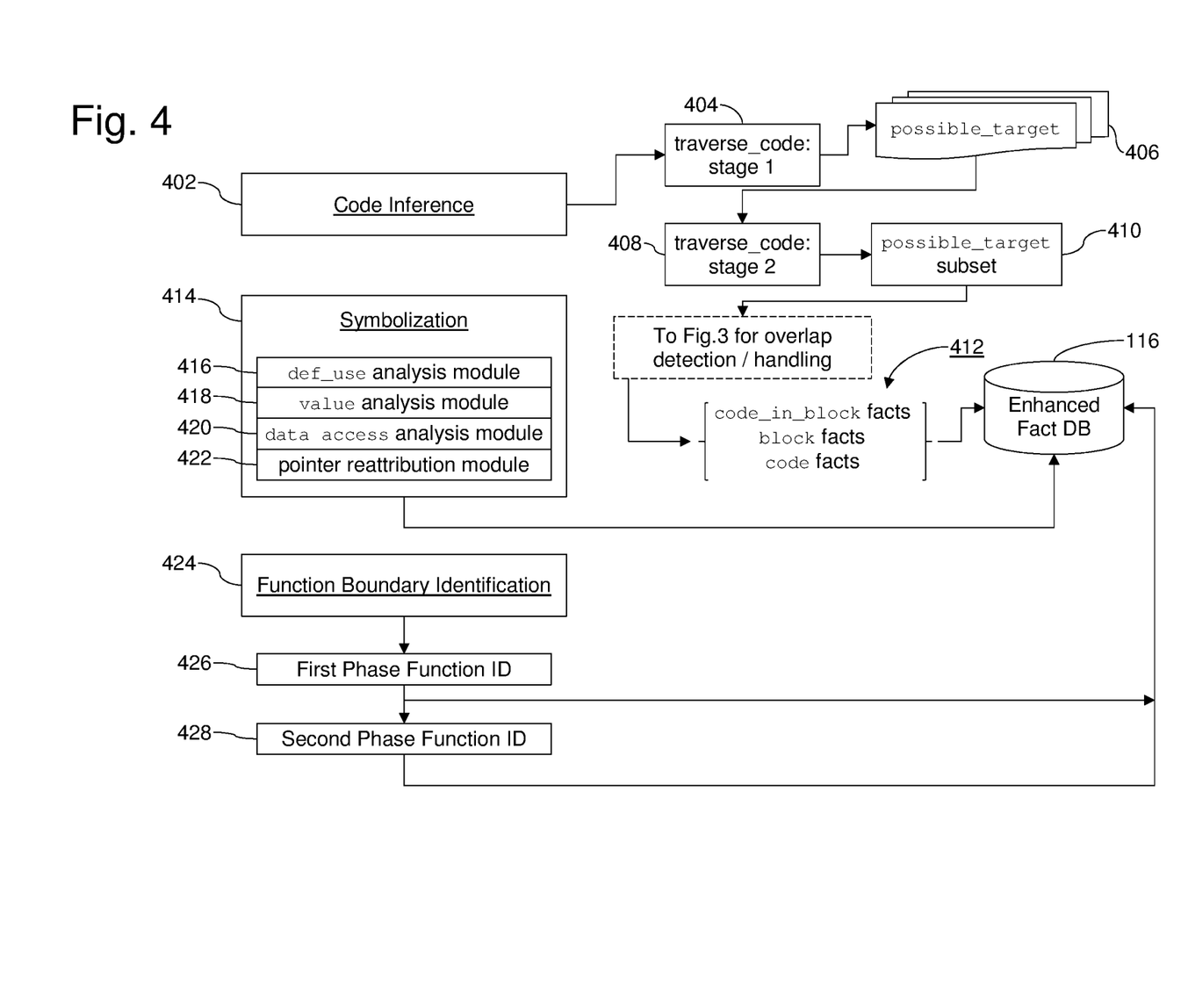
FIG. 4 is a block diagram showing components of the disassembly approach that makes use of rules and heuristics according to certain example embodiments.

The first disassembly approach, code inference, may be thought of as relating to code location identification. A code inference module 402 in the analysis engine 114 computes the valid instructions organized in blocks of code. It infers the facts code_in_block, block, and code. Blocks in this sense are a sequence of contiguous instructions. A fact of the form block (Address) specifies that there is a block of code starting at address "Address." A fact of the form code (Address) specifies that there is an instruction at address "Address." Finally, a fact code_in_block (AI, AB) states that the instruction at address "AI" belongs to the block starting at address "AB".

This may be accomplished by using a traverse_code component, twice. The first traversal 404 considers any potential address in the code or data as a starting point from which to start traversing (a possible_target) and provides a first approximation of the code. The results of this first traversal can be used to define better block limits (block start and end points) based on a list of possible target code blocks 406. For example, block limits for all the locations that are possible targets and for all the locations where two potential blocks converge may be defined. Thus, in the second traversal 408, the generated blocks will not have "common tails" where there are two blocks that start at different locations but converge into the same location.

The second traversal 408 only considers an address appearing in the code as a possible target if the code where it appears has been already traversed. Consider, for example, a jump instruction located at address A1 and whose destination is A2, represented by "A1: JMP A2". A2 constitutes a possible target and thus an address where disassembling starts. However, in the second traversal, A2 is considered as a starting point only once A1 has been traversed. In contrast, the first traversal considers A2 as a possible starting point even if A1 is never visited (and thus appears in the list of possible targets 406 generated by the first traversal 404). There are two classical approaches for disassembly: linear sweep and recursive traversal. A linear-sweep disassembly traverses all the code sections sequentially, whereas a recursive traversal starts from an entry point and follows the control flow of the program. The second traversal here in a sense is more similar to a recursive traversal disassembly, although it still has a linear sweep component as it explores the instructions after locations that cannot fall-through. In the previous example involving "A1: JMP A2", the second traversal will explore both the code after the jump (even though the jump is unconditional) and the code at the jump destination A2. A subset 410 of the possible targets list 406 is generated.

The code inference module 402 also computes block_still_overlap for debugging purposes, e.g., based on the subset 410 of the possible targets list 406 is generated. That is, blocks of code that overlap with each other (and therefore are in conflict) therefore can be detected. These blocks are assigned points according to several heuristics, e.g., as described above in connection with FIG. 3. Predefined heuristics may be stored to a data store accessible by the code inference module 402 in certain example embodiments. Then, for each two conflicting blocks, the one with more points is kept, e.g., as also described above in connection with FIG. 3. The enhanced fact database 116 thus can be populated with the code_in_block, block, and code facts 412, as indicated above.

The second disassembly approach, symbolization, may be thought of as relating to literal reference disambiguation. As will be appreciated from the above, the symbolization module 414 may include, for example, def_use analysis 416, value analysis 418, data access analysis 420, pointer reattribution 422, and/or other modules. The def_use module 416 computes definition-to-use (DU) chains for a subset of the registers. A DU chain includes a definition D and all uses U reachable from that definition without any intervening definitions. DU chains in general can be computed using a static code analysis approach such as data flow analysis, and DU chains are useful in identifying and tracking the logical representations of the variables through the code. The use of Datalog, for example, is advantageous in certain example embodiments, as these kinds of data flow analyses are very easy to express therein. In certain example embodiments, the calculation of DU chains is limited to those chains that are related eventually to an access to memory.

The DU facts generated have the following format in certain example embodiments: def_used (EADef, Register, EAUsed, IndexUsed), which represents that the register "Register" defined in the address EADef is used in the address EAUsed in the operand with index "IndexUsed". Consider the following code snippet:
  1: mov RAX, RCX
  5: add RAX, RAX
  8: mov RDX, 0x404040
  13: mov BX, [RAX+RDX]
Some of the facts generated by the analysis are:
  def_used (1, RAX, 5, 1) and def_used (1, RAX, 5, 2): The register RAX is defined in address 1 and used in address 5 in the first operand and second operands.
  def_used (5, RAX, 13, 2): The register RAX is defined in address 5 and used in address 13 in the second operand.
  def_used (8, RDX, 13, 2): The register RDX is defined in address 8 and used in address 13 in the second operand.

The value module computes the value held in a register at a point. The ultimate objective of the value module is to estimate how memory is being accessed. For that purpose, an analysis that approximates the values of the registers that are used to access memory is performed. There are many possible ways of approximating the values of the registers. For example, it is possible to just approximate the values of the registers that contain a constant value. This could be represented with a single number. However, this representation may be very limited. On the other extreme, it is possible to represent the value of a register with a complex symbolic expression such as, for example, a polynomial. The chosen representation may be between these two extremes, thus achieving a compromise between expressivity and efficiency. It is based on the idea that typical memory accesses follow a particular pattern where the memory address that is accessed is computed using a base address, plus an index multiplied by a multiplier. Therefore, the value analysis infers facts of the for value_reg(EA, Reg, EA2, Reg2, Multiplier, Offset) which represent that the value of a register at a point (EA) is expressed is equal to the value of another register at another point (EA2_reg1) multiplied by a multiplier plus an offset (or base address):

$$val(EA, RegReg, EA) = val(EA2, Reg2Reg1, EA\_reg1) * Multiplier + Offset$$

Consider the example provided above in connection with the DU techniques of certain example embodiments. Some of the facts inferred by the analysis are:
value_reg (5, RAX, 1, RCX, 1, 0): The value of register RAX at the address 5 (before executing the instruction) is equal to the value of register RCX at address 1.
value_reg (13, RAX, 5, RAX, 2, 0): The value of the register RAX at the address 13 is equal to two times the value of the register RAX at address 5.
value_reg (13, RDX, 5, NONE, 0, 0x404040): The value of the register RDX at the address 13 is equal to 0x404040.

The analysis first computes relations of the form defined above for different instructions and using the DU chains. Then, a second propagation phase chains together relations like the above. For instance, the second phase of the value analysis would combine the two first facts above to generate the following fact:
value_reg (13, RAX, 1, RCX, 2, 0): The value of register RAX at the address 13 is equal to two times the value of register RCX at address 1.

In addition to chaining relations together, cases are handled where, for example, two registers being added together or subtracted if it turns out that they can be expressed in terms of the same register. The second phase also detects possible loops. If there is a fact of the form value_reg (EA, Reg, EA, Reg, 1, N) where Reg is defined in terms of itself at the same address, then Reg might represent a counter of a loop that is incremented N in each iteration. Output from the symbolization module 414 ultimately is provided to the enhanced fact database.

The data access module 420 computes data access patterns that represent that an address is accessed with a size and multiplier from a particular instruction. The preferred data access (e.g., from a plurality of possible data accessions that might be valid in the disassembly) is the address most likely accessed from the data access pattern at a particular location. In certain example embodiments, a data access pattern has the form data_access_pattern (Address, Size, Multiplier, Origin). Data access patterns may be computed in certain example embodiments by checking memory accesses, and with the help of the value analysis module 418. Some special cases are checked explicitly. Continuing with the example from above, the data access pattern for instruction 13 will be computed. This instruction accesses the memory at RAX+RDX. The value analysis tells us that the value of RAX can be expressed as 2*RCX (at address 1) and RDX is 0x404040. Therefore, there is an access of the form 2*X+0x404040. It also is known that instruction 13 reads two bytes of memory. Consequently, the conclusion can be reached that address 0x404040 is probably accessed to read 2 bytes of memory with a 2 multiplier. This is represented with the following fact: data_access_pattern (0x404040, 2, 2, 13). These data access patterns provide very sparse information, but if an address X is accessed with a multiplier, it is likely that X+multiplier, X+2*multiplier, etc., are also accessed the same way. To determine how long to repeat this pattern, these accesses are propagated using the multiplier until some other conflicting access is reached. For example, addresses 0x404040+2, 0x404040+4, . . . , are accessed with the same pattern (2 bytes are read from instruction 13).

The results may be refined in a number of different ways. First, for example, once the accesses have been propagated, it is possible that several data access patterns have been propagated to the same location. The one that is closest to the location may be selected, and the other propagated data accesses may be discarded. It is noted that this is similar to assigning points to different data access patterns, as discussed above. Second, for example, often there will be data accesses that are related. For instance, accesses to different fields of an array of structs can be considered related. Thus, certain example embodiments may consider those accesses to be "paired." In such cases, better precision is possible if those accesses are propagated together. In this regard, propagation can be stopped as soon as any of the paired accesses reaches another access.

Pairing may be thought of as follows: Assume that there are two accesses to locations X and Y with multipliers M1 and M2. These two accesses can be considered paired if M1=M2 and X<=Y X+M1.

A pointer reattribution module 422 also may be used in connection with symbolization efforts. This may include, for example, detecting cases where a number is the result of a symbol+constant. The pointer reattribution 422 may make use of the results of the above analyses (the def_use, value, and data access analyses). In other words, pointer reattribution is basically a part of the symbolization that helps take care of a set of specific cases, namely, the symbolic expressions that are not just a symbol but a symbol+constant. Pointer reattribution in certain example embodiments generates the facts symbolic_operand_moved and symbolic_data_moved, e.g., as discussed in greater detail below.

The data symbolization itself may use the following and/or other heuristics, which may be predefined and stored in a data store:
An address_array heuristic may help determine whether potential symbols are evenly spaced. The more symbols, the less likely they are all value collisions. Having at least three symbols evenly spaced may be considered to be an array.
A preferred_data_access heuristic and a data_access_patterns heuristics (from the data access analysis module 420 discussed above) may determine that (1) if an address is accessed with the size of the pointer, it is more likely to be a pointer, and/or (2) if an address is accessed with a size other than the size of the pointers, it almost certainly is not a pointer.
A strings heuristic may determine that if there is a pointer candidate in what seems to be a string, it is less likely to be a pointer.
An aligned location heuristic may determine that if a pointer candidate is aligned, it is more likely to be a pointer. Compilers usually (but not always) store pointers aligned.

The final symbolization information has the following format:
symbolic_operand (EA, Index): the instruction at address EA has a symbol in the Index-th operand.
symbolic_operand_moved (EA, Index, Original, Moved): the instruction at address EA has a symbol in the Index-th operand. The operand contains the number "Original" but it refers to the symbol at the address "Moved". Therefore, the symbolic operand has an expression of the form symbol+constant, where symbol is "Moved" and constant is "Moved-Original".

symbolic_data (EA): the data at address EA is symbolic.

symbolic_data_moved (EA, Original, Moved): the data at address EA is symbolic. As for the operand case, it contains the number "Original", but it refers to the symbol at the address "Moved". Therefore, the symbolic expression at address EA has the form symbol+ constant, where symbol is "Moved" and constant is "Moved-Original".

symbol_minus_symbol (EA, Symbol1, Symbol2): The data at address EA is symbolic. The symbolic expression is the difference between two symbols: Symbol2−Symbol1.

The function boundary identification module 424 may operate in several phases in certain example embodiments. In a first function inference phase 426, symbol information (from the binary symbol table if it is present) and heuristics may be used to identify functions (e.g., from the identified blocks of code). Below, some of the heuristics are enumerated:

If an address is the destination of a direct call, it is the beginning of a function.

If an address is at the beginning of a code section, it is also the beginning of a function.

Some sections usually contain function pointers, e.g., ".init_array" in ELF binaries. Any symbol in one of these sections is likely to point to the beginning of a function.

There are sequences of instructions that are typical at the beginning of functions, i.e., function prologues.

The code that precedes the beginning of a function also adheres to typical patterns such as, for example, unconditional jumps or return instructions followed by padding using NOPs (no operations) to ensure certain alignment.

In the data sections, there can be symbol tables. These tables usually correspond to jump tables (from switch instructions) or function tables. If it is concluded that one or several of the symbols in a table refer to functions, it is likely that the others refer to functions as well.

Similarly, an isolated symbol in a data section (not contained in a symbol table) that points to code is more likely to be a function reference.

In a second function inference phase 428, new functions may be added by finding blocks of code that are contiguous to, but not reachable from, a complete function. A complete function is a function that does not have unresolved jumps. These blocks may be deemed new functions.

Once the enhanced fact database has been populated, content from it is organized into a format of valid assembler code.

Although certain inference modules have been described above, it will be appreciated that others may be implemented in place of, or together with, those specifically mentioned. For example, in certain example embodiments, inference modules implemented in Datalog can receive and consider additional information provided by the user or other analyses in the form of additional facts. This additional information can guide the disassembly, e.g., in case the existing heuristics and analyses were insufficient.

It will be appreciated that certain example embodiments encode all rules and heuristics into Datalog rules and, in so doing, Datalog advantageously ensures that the resulting universe of facts about the program is automatically consistent. For example, determinations on code location fit determinations on symbolization, fit determinations on function boundaries, etc. This consistency is a significant technical advantage and technical improvement, e.g., compared to conventional approaches to generating disassemblies and in terms of enable the creation of reassemblable disassemblies. A small set of properties of programs (in effect, the physics of the world of binary execution) in which the effects of all rules and heuristics are cached out is defined. From that point on, it becomes possible to write new rules and heuristics with complete independence of existing rules and heuristics relying on the Datalog engine to mediate all interactions between rules through our defined properties. This architecture is technically advantageous because it both (1) significantly eases the development of new heuristics and (2) makes it possible to "plug in" new heuristics (potentially even at run time) with minimal integration.

Although certain example embodiments have been described in connection with Datalog, it will be appreciated that other declarative programming languages (including answer set programming (ASP) languages) may be used in different example embodiments. Moreover, Prolog, SQL, XQuery, probabilistic graph models (PGMs), and/or other languages may be used in connection with different example embodiments. SQL and XQuery may be used, for example, provided that they are implemented, or modified for implementation, with sufficient expressive power. PGMs are similar to Datalog except that they explicitly do allow for weights on rules, which can make implementation easier but execution slower in general. Furthermore, certain example embodiments may be made to work with source programming languages including, for example, C, C++, assembly, Java, etc.

It will be appreciated that certain example embodiments may run in connection with a standalone or networked computer and/or computer system comprising a plurality of computer nodes. In an example runtime environment, for example, an application for creating reassemblable disassemblies according to an embodiment may run in memory. Components may include, for example, memory, at least one processor, a data store, an OS kernel, etc. It will be appreciated that such an environment may be used in connection with, or be simply backed by an embodiment as shown in FIGS. 1-4. It also will be appreciated that certain example embodiments may work in any design time and/or runtime environment including, for example, Windows, Linux, Unix, MacOS, and/or other operating systems present on the example electronic devices mentioned above. In a similar vein, the techniques described herein may be used in any suitable combination, sub-combination, or combination of sub-combinations, e.g., as appropriate to the programming language, runtime environment, etc.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor (e.g., central processing unit (CPU) or specialized processor) execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of disassembling an executable, the method comprising:
   parsing the executable, and decoding possible instructions in the executable in connection with the parsing;
   generating an initial fact database comprising the possible instructions;
   generating an enhanced fact database by executing a plurality of inference modules on the initial fact database, at least some of the inference modules being expressed in a declarative query language and including (a) a code inference module structured to compute valid instructions organized in blocks of code, (b) a symbolization module structured to disambiguate between symbols and memory addresses, and (c) a function inference module structured to identify functions; and
   organizing content from the enhanced fact database into a format of valid assembler code;
   wherein one or more of the inference modules implement(s) a soft heuristic by:
      generating a problem/solution space for the issue for which evidence is to be built and/or for which a conflict is to be resolved;
      subjecting at least some of the members in the problem/solution space to rules that assign points to different outcomes related to the issue for which the evidence is to be built and/or for which the conflict is to be resolved;
      determining which one or more members of the problem/solution space has/have the most points; and
      admitting to the enhanced fact database the one or more members of the problem/solution space determined to have the most points; and
   wherein one or more of the inference modules implement(s) the soft heuristic in addition to hard rules for fact generation, the hard rules and soft heuristic(s) being encoded into declarative relations.

2. The method of claim 1, wherein the declarative query language is Datalog.

3. The method of claim 1, wherein all hard rules and soft heuristics are encoded into Datalog rules.

4. The method of claim 3, wherein execution of a Datalog engine on the Datalog rules results in a consistent fact universe for the initial fact database and the enhanced fact database.

5. The method of claim 1, wherein new hard rules and/or new soft heuristics are definable and suitable for use in generating facts for the initial fact database and/or enhanced fact database, independent of existing hard rules and/or soft heuristics.

6. The method of claim 1, wherein the soft heuristic is implemented for code block detection in the code inference module.

7. The method of claim 1, wherein the symbolization module implements heuristics for determining that an array likely is present based on the presence of a plurality of evenly-spaced symbols, determining that an accessed address likely is a valid pointer based on a size of the associated access being pointer-sized, determining that a pointer candidate in what appears to be a string is less likely to be a valid pointer, and/or determining that a pointer candidate that is aligned is more likely to be a valid pointer.

8. The method of claim 1, wherein the symbolization module includes definition to use chain analysis, value analysis, and/or data access analysis.

9. The method of claim 1, wherein the function inference module uses symbol information and heuristics to identify a first set of functions, and attempts to add a second set of functions by finding blocks of code that are contiguous to, but not reachable from, a complete function in the first set of functions.

10. The method of claim 1, wherein the valid assembler code is assembleable into a valid executable.

11. The method of claim 1, wherein one or more of the inference modules are configured to receive additional rules from a user and/or from additional programmatic analysis.

12. A system for disassembling an executable, comprising:
   a non-transitory computer readable storage medium; and
   processing resources including at least one memory and a hardware processor, the processing resources being configured to:
      receive the executable;
      parse the executable, and decode possible instructions in the executable in connection with the parsing;
      generate an initial fact database comprising the possible instructions, the initial fact database being stored to the non-transitory computer readable storage medium;
      generate an enhanced fact database by executing a plurality of inference modules on the initial fact database, at least some of the inference modules being expressed in a declarative query language and including (a) a code inference module structured to compute valid instructions organized in blocks of code, (b) a symbolization module structured to disambiguate between symbols and memory addresses, and (c) a function inference module structured to identify functions, the enhanced fact database being stored to the non-transitory computer readable storage medium; and
      organize content from the enhanced fact database into a format of valid assembler code,
   wherein one or more of the inference modules implement(s) a soft heuristic by:
      generating a problem/solution space for the issue for which evidence is to be built and/or for which a conflict is to be resolved;
      subjecting at least some of the members in the problem/solution space to rules that assign points to different outcomes related to the issue for which the evidence is to be built and/or for which the conflict is to be resolved;
      determining which one or more members of the problem/solution space has/have the most points; and
      admitting to the enhanced fact database the one or more members of the problem/solution space determined to have the most points; and
   wherein one or more of the inference modules implement(s) the soft heuristic in addition to hard rules for fact generation, the hard rules and soft heuristic(s) being encoded into declarative relations.

13. The system of claim 12, wherein the declarative query language is Datalog.

14. The system of claim 12, wherein all hard rules and soft heuristics are encoded into Datalog rules, and
wherein execution of a Datalog engine on the Datalog rules results in a consistent fact universe for the initial fact database and the enhanced fact database.

15. The system of claim 12, wherein the symbolization module implements heuristics for determining that an array likely is present based on the presence of a plurality of evenly-spaced symbols, determining that an accessed address likely is a valid pointer based on a size of the associated access being pointer-sized, determining that a pointer candidate in what appears to be a string is less likely to be a valid pointer, and/or determining that a pointer candidate that is aligned is more likely to be a valid pointer.

16. The system of claim 12, wherein the symbolization module includes definition to use chain analysis, value analysis, and/or data access analysis.

17. The system of claim 12, wherein the function inference module uses symbol information and heuristics to identify a first set of functions, and attempts to add a second set of functions by finding blocks of code that are contiguous to, but not reachable from, a complete function in the first set of functions.

18. The system of claim 12, wherein the valid assembler code is assembleable into a valid executable.

19. The system of claim 12, wherein one or more of the inference modules are configured to receive additional rules from a user and/or from additional programmatic analysis.

20. A non-transitory computer readable storage medium tangibly storing a program that, when executed by a computing system including at least one processor, is configured to disassemble an executable, by performing functionality comprising:

parsing the executable, and decoding possible instructions in the executable in connection with the parsing;

generating an initial fact database comprising the possible instructions;

generating an enhanced fact database by executing a plurality of inference modules on the initial fact database, at least some of the inference modules being expressed in a declarative query language and including (a) a code inference module structured to compute valid instructions organized in blocks of code, (b) a symbolization module structured to disambiguate between symbols and memory addresses, and (c) a function inference module structured to identify functions; and organizing content from the enhanced fact database into a format of valid assembler code, wherein one or more of the inference modules implement(s) a soft heuristic by:

generating a problem/solution space for the issue for which evidence is to be built and/or for which a conflict is to be resolved;

subjecting at least some of the members in the problem/solution space to rules that assign points to different outcomes related to the issue for which the evidence is to be built and/or for which the conflict is to be resolved;

determining which one or more members of the problem/solution space has/have the most points; and admitting to the enhanced fact database the one or more members of the problem/solution space determined to have the most points; and wherein one or more of the inference modules implement(s) the soft heuristic in addition to hard rules for fact generation, the hard rules and soft heuristic(s) being encoded into declarative relations.

* * * * *